(12) United States Patent
Hardee et al.

(10) Patent No.: US 10,958,958 B2
(45) Date of Patent: Mar. 23, 2021

(54) INTELLIGENT UPDATING OF MEDIA DATA IN A COMPUTING ENVIRONMENT

(71) Applicant: INTERNATIONAL BUSINESS MACHINES CORPORATION, Armonk, NY (US)

(72) Inventors: Christopher J. Hardee, Raleigh, NC (US); Scott E. Schneider, Rolesville, NC (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/107,002

(22) Filed: Aug. 21, 2018

(65) Prior Publication Data

US 2020/0068243 A1 Feb. 27, 2020

(51) Int. Cl.
| | |
|---|---|
| *H04N 21/235* | (2011.01) |
| *H04N 21/435* | (2011.01) |
| *H04N 21/458* | (2011.01) |
| *H04N 21/462* | (2011.01) |
| *H04N 21/466* | (2011.01) |
| *H04N 21/84* | (2011.01) |
| *H04N 21/262* | (2011.01) |
| *H04N 21/472* | (2011.01) |
| *H04L 29/06* | (2006.01) |
| *G06N 20/00* | (2019.01) |
| *G06F 40/30* | (2020.01) |

(52) U.S. Cl.
CPC ....... *H04N 21/26291* (2013.01); *G06F 40/30* (2020.01); *G06N 20/00* (2019.01); *H04L 65/60* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 6,638,314 | B1 | 10/2003 | Meyerzon et al. |
| 7,882,099 | B2 | 2/2011 | Agrawal et al. |
| 8,548,972 | B1 | 10/2013 | Jain et al. |
| 8,799,262 | B2 | 8/2014 | Paduroiu |

(Continued)

FOREIGN PATENT DOCUMENTS

| | | |
|---|---|---|
| CN | 101388022 B | 6/2010 |
| CN | 103942257 B | 3/2014 |
| CN | 103945278 A | 7/2014 |

OTHER PUBLICATIONS

Alam et al., "Novel approaches to crawling important pages early," Knowledge and Information Systems, vol. 33, Issue 3, Dec. 2012 (28 pages).

(Continued)

*Primary Examiner* — Brian T Pendleton
*Assistant Examiner* — Jean D Saint Cyr
(74) *Attorney, Agent, or Firm* — Griffiths & Seaton PLLC (57) ABSTRACT

Embodiments for intelligent updating of media data by a processor. One or more data sources may be searched to identify updated data content for streamed media data. The data content may be updated in the streamed media data with the updated data content from the one or more data sources according to a defined priority.

14 Claims, 7 Drawing Sheets

(56) References Cited

U.S. PATENT DOCUMENTS

| | | | | |
|---|---|---|---|---|
| 2002/0072353 A1* | 6/2002 | Kim | ............... | H04M 1/72519 |
| | | | | 455/414.1 |
| 2007/0022085 A1 | 1/2007 | Kulkarni | | |
| 2010/0100845 A1* | 4/2010 | Khan | ............... | G06F 16/9535 |
| | | | | 715/810 |
| 2010/0242077 A1* | 9/2010 | Kota | ............... | H04N 7/24 |
| | | | | 725/110 |
| 2011/0179453 A1* | 7/2011 | Poniatowski | ......... | G06F 16/787 |
| | | | | 725/58 |
| 2012/0072408 A1 | 3/2012 | Carmel et al. | | |
| 2012/0147141 A1* | 6/2012 | Sasaki | ............... | G11B 20/1217 |
| | | | | 348/43 |
| 2014/0047475 A1* | 2/2014 | Oh | ............... | H04N 21/8586 |
| | | | | 725/40 |
| 2014/0379359 A1* | 12/2014 | Basey | ............... | G16H 10/20 |
| | | | | 705/2 |
| 2016/0055243 A1 | 2/2016 | Xu et al. | | |
| 2017/0293414 A1* | 10/2017 | Pierce | ............... | G06F 3/0488 |
| 2018/0004560 A1* | 1/2018 | Shankar | ............... | G06F 9/45558 |

OTHER PUBLICATIONS

Johansen et al., "Search-based composition, streaming and playback of video archive content," Multimedia Tools and Applications, vol. 61, Issue 2, Nov. 2012 (27 pages).

Liakos et al., "Focused crawling for the hidden web," World Wide Web, vol. 19, Issue 4, Jul. 2016 (27 pages).

* cited by examiner

INTELLIGENT UPDATING OF MEDIA DATA IN A COMPUTING ENVIRONMENT

BACKGROUND OF THE INVENTION

Field of the Invention

The present invention relates in general to computing systems, and more particularly, to various embodiments for intelligent updating of media data in a computing environment using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems. For example, technological advances enable computer systems such as, for example, console gaming systems, to grow in popularity with a wide array of functions and features.

SUMMARY OF THE INVENTION

Various embodiments for intelligent updating of media data in a computing system by a processor are provided. In one embodiment, by way of example only, a method for intelligent updating of media data, again by a processor, is provided. One or more data sources may be searched to identify updated data content for streamed media data. The data content may be updated in the streamed media data with the updated data content from the one or more data sources according to a defined priority.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Various embodiments relate to the field of intelligent updating of media data. For example, data, which may be presented in a video stream, may be outdated. A user may be accessing and viewing a video. However, if one or more updates are provided to the video, the user may be viewing an out-of-date copy/version of the video without being enabled to view the updated content. Moreover, a video content editor may even fail and/or forget to add all of connotations, links, or other updated materials to the video, which may serve as additional material associated with the video.

Thus, the present invention provides for an intelligent updating service of media data. In one aspect, the intelligent updating service (e.g., a cognitive service) may perform a search (e.g., an internet web crawl) for an uploaded video. The intelligent updating service may be executing and running in a back-end of a computing system so as to locate and identify an update (e.g., an updated version or segment of the video) on the media content being streamed in the media data (e.g., video data). The intelligent updating service may update relevant data when the video is streaming or broadcasted according to a dynamic priority stack and lineage.

In one aspect, various embodiments, as described herein, provide for intelligent updating of media data in a computing system such as, for example, in an IoT computing environment using one or more IoT devices (e.g., computer, smartphone, camera, voice activated hub, etc.). In one embodiment, by way of example only, one or more data sources may be searched to identify updated data content for streamed media data. The data content may be updated in the streamed media data with the updated data content from the one or more data sources according to a defined priority (e.g., such as by using a priority stack). One or more elements of the content that receive the most emphasis (e.g., most detected keywords, descriptions, and/or utterances) of in the video may determine the importance of keywords used to find and sort the results.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
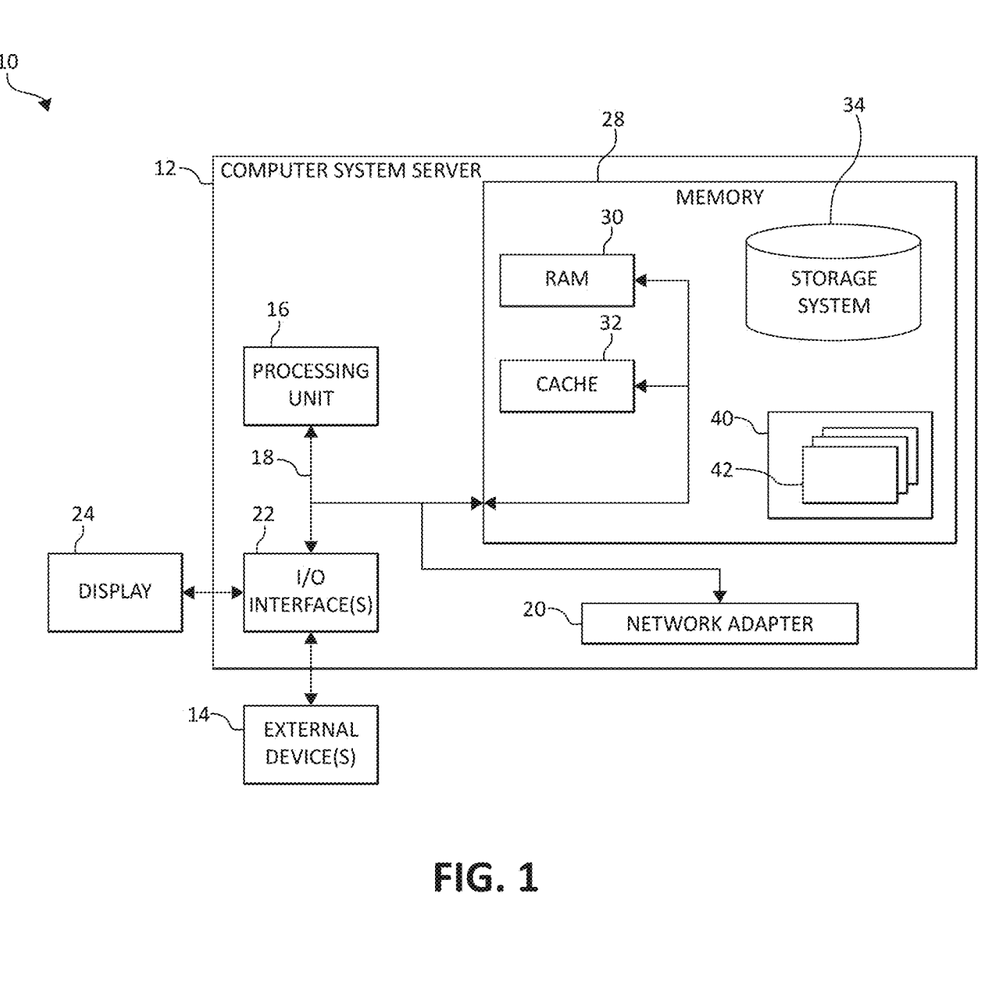
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
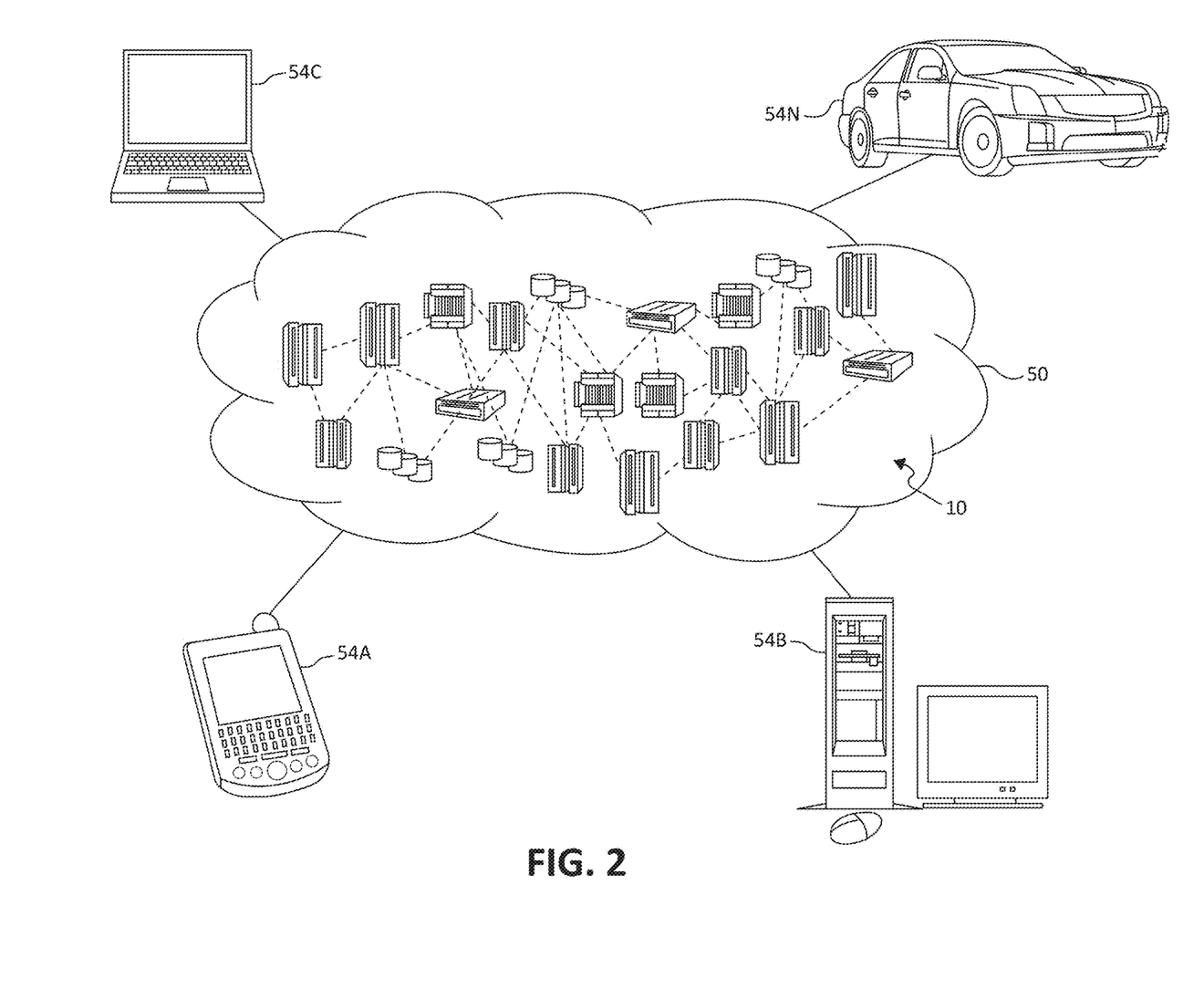
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or video gaming system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
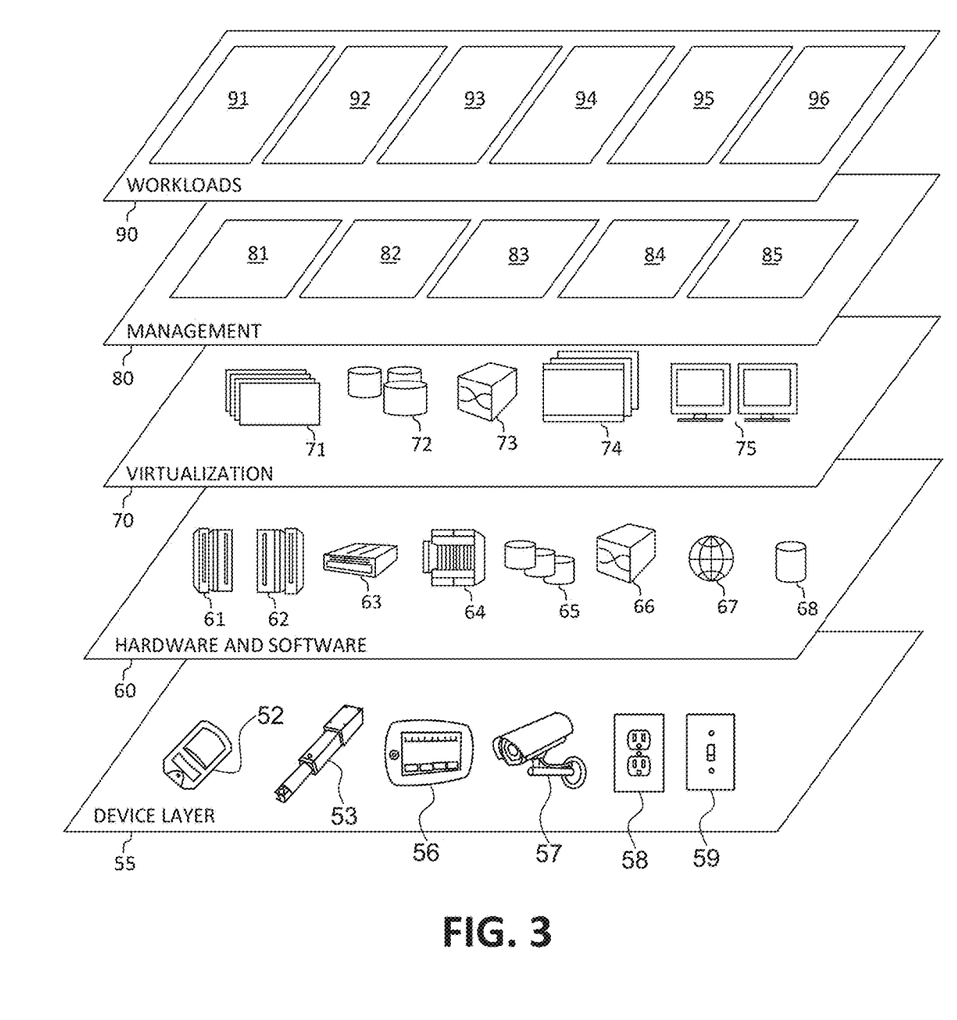
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various consistent workloads and functions 96 for intelligent updating of media data. In addition, workloads and functions 96 for intelligent updating of media data may include such operations as data analytics, data analysis, and as will be further described, notification functionality. One of ordinary skill in the art will appreciate that the workloads and functions 96 for intelligent updating of media data may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
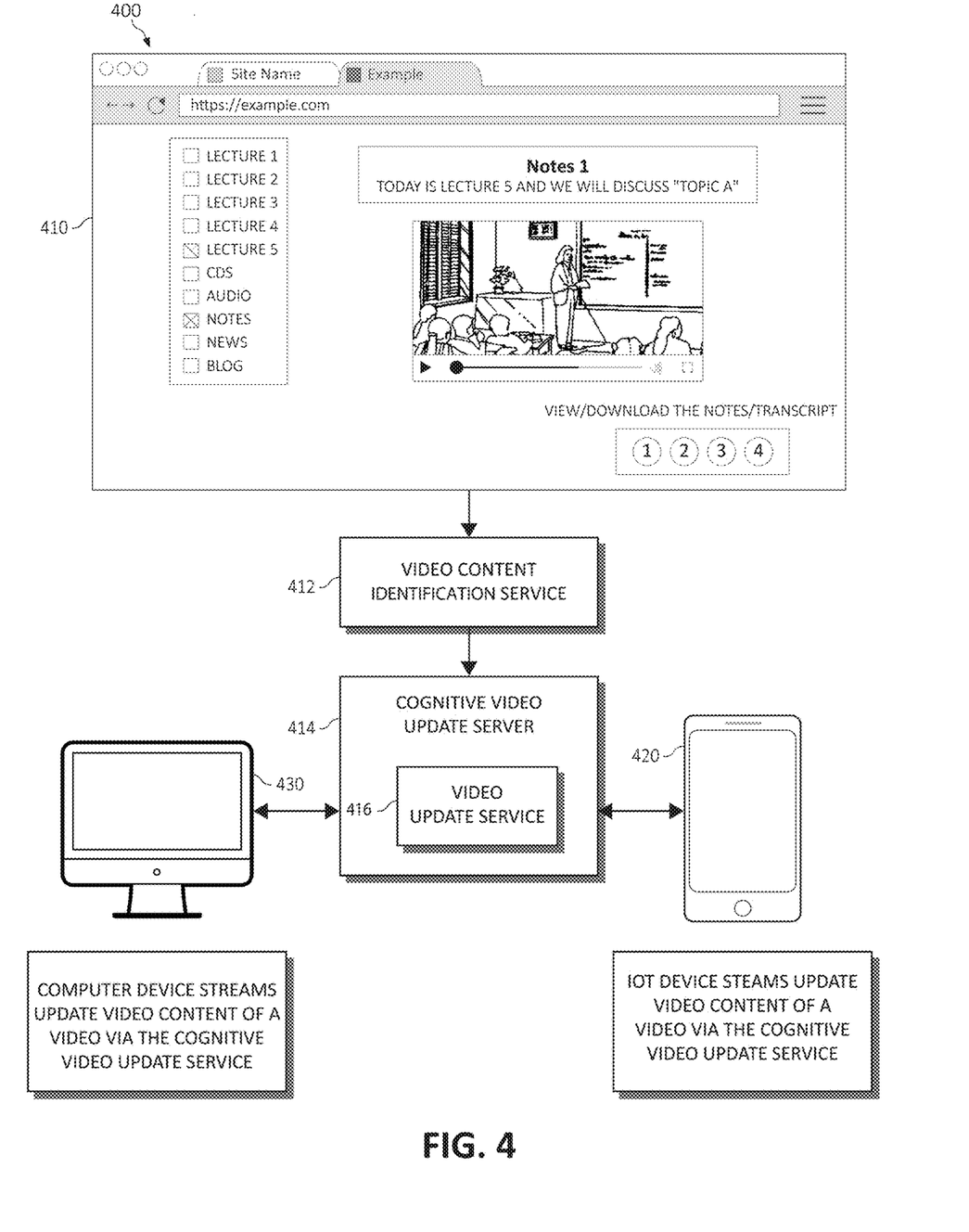
FIG. 4 is a block diagram depicting a system for intelligent updating of media data by a processor, again in which aspects of the present invention may be realized.

Turning now to FIG. 4, a block diagram of exemplary functionality 400 relating to intelligent updating of media data is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. In one aspect, one or more of the components, modules, services, applications, and/or functions described in FIGS. 1-3 may be used in FIG. 4. Many of the functional blocks 400 may execute as background processes on various components, either in distributed computing components, or on the user device, or elsewhere.

The computing system 400 for intelligent updating of media data may include a cognitive video update server 414 having a video update service 416, video content identification service 412, and target devices 420, 430 for identifying uploaded media data on a content site 410 (e.g., website, social media platform, online database, cloud computing system, etc.).

In one configuration, in association with the cognitive video update server 414, the video content identification service 412 may cognitively search one or more data sources such as, for example, content site 410 to identify updated data content for streamed media data. For example, the video content identification service 412 may identify that content site 410 includes media data such as, for example, lectures 1-5, compact discs ("CDs"), audio file, notes, news, and/or blog data. A streamed video (e.g., lecture 5 from content site 410 that includes notes 1) may be displayed and/or streamed on or from content site 410 (e.g., a streamed live/real-time video, and/or recorded video streamed at a later time period). Also, the video content identification service 412 may identify updated video content for the streamed video (e.g., updated content for lecture 5).

The cognitive video update server 414, using the video update service 416, may extract from the streamed media data one or more keywords, a description of one or more topics, or a combination thereof. The cognitive video update server 414, using the video update service 416, may also arrange into a defined priority (e.g., a priority stack), one or more keywords, extracted from the streamed media data, according to one or more defined parameters, a determined level of priority, a frequency of times communicated/detected in the streamed media data, a current topic of the streamed media data, or a combination thereof. A priority stack may be a list of items in a queue arranged in a prioritized fashion/order based on dynamically learned or known preferences.

The video update service 416 may compare the updated data content identified on the content site 410 with the data content of streamed media data from content site 410 to determine whether the data content of the streamed media data is outdated, and/or a most recent update as compared to other updates. The cognitive video update server 414, using the video update service 416, may update data content in the streamed media data with the updated data content from the content site 410 according to the defined priority (e.g., a priority stack). The cognitive video update server 414 using the video update service 416 may initialize a machine learning component to learn, modify, or update the data content in the streamed media data with the updated data content. The machine learning includes using a natural language processing (NLP) operation, an image and audio recognition operation, an intelligent search operation, a cognitive memory operation, or combination thereof.

In an additional aspect, cognitive video update server 414 may form a video lineage according to the streamed media data indicating progress of the data content, the updated content, or a combination thereof. The video lineage may be a collection (e.g., age-wise collection) of different versions of video content that may be generated over a period of time (e.g., years). When a new version of the video content is available, the current video selection may be updated and/or a user may be prompted with the new video content of that particular snippet/sub-section of in the streaming video content.

The cognitive video update server 414 may display the updated content in at least a portion of a graphical user interface (GUI) of target devices 420, 430 while simultaneously displaying the streamed media data in the GUI. That is, the streamed media data is video content from one or more videos of content site 410 displayed on target devices 420, 430.

In operation, for example, target device 420 may be a computer device that streams the updated video content of a video (e.g., lecture 5) via the video update service 416 (e.g., a cognitive video update service). Also, the target device 420 may be an IoT computing device (e.g., smartphone, tablet, etc.) that streams the updated video content of a video (e.g., lecture 5) via the video update service 416.

Figure 5:
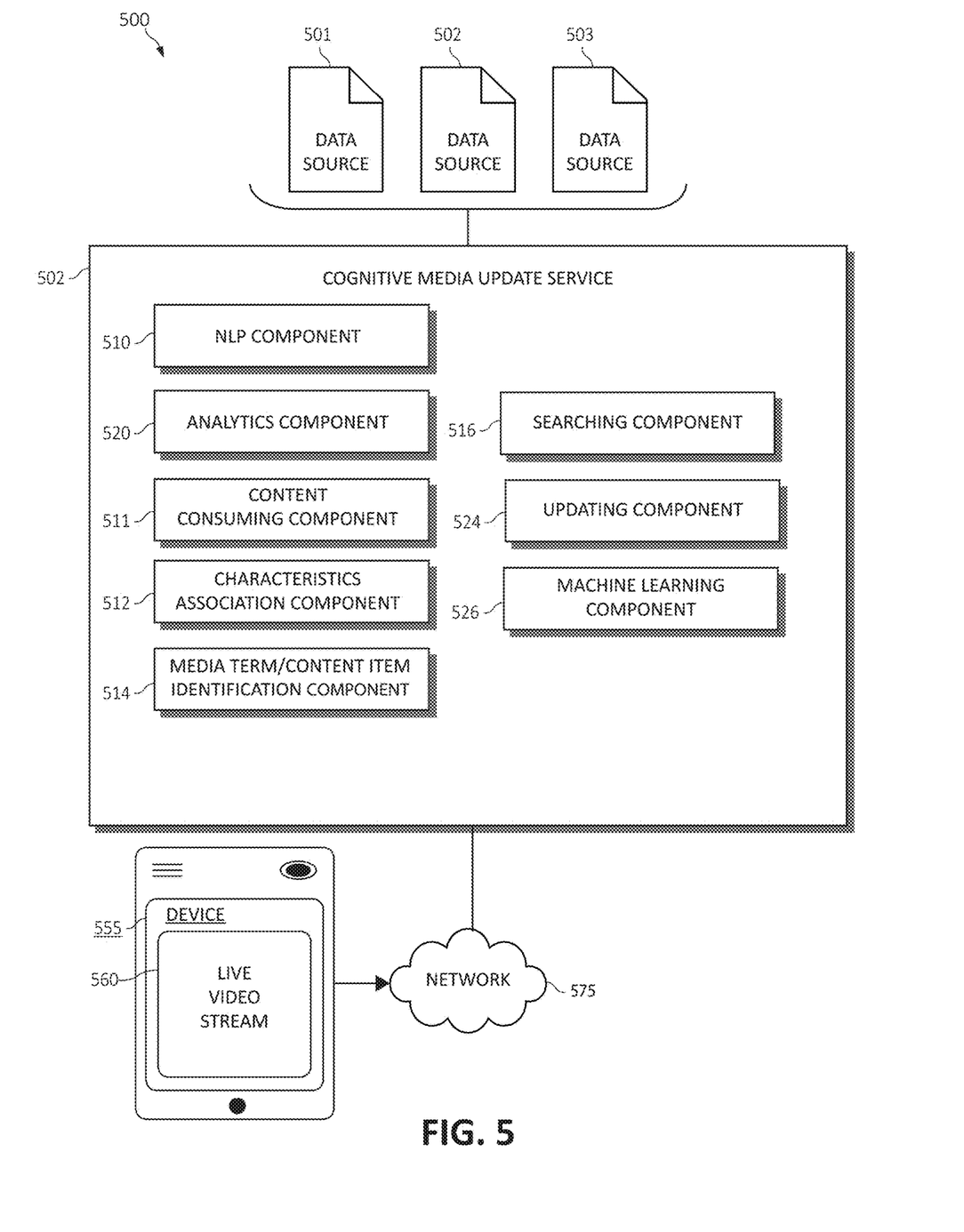
FIG. 5 is a block diagram depicting a system for intelligent updating of media data by a processor, again in which aspects of the present invention may be realized.

Turning now to FIG. 5, a block diagram of exemplary functionality 500 relating to intelligent updating of media data is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-3. In one aspect, one or more of the components, modules, services, applications, and/or functions described in FIGS. 1-4 may be used in FIG. 5. Many of the functional blocks 500 may execute as background processes on various components, either in distributed computing components, or on the user device, or elsewhere.

The computing system 500 may provide a cognitive media update service 502. The cognitive media update service 502 may be associated with one or more devices such as, for example, device 555 (e.g., a desktop computer, laptop computer, tablet, smartphone, and/or another electronic device that may have one or more processors and memory) having a graphical user interface ("GUI") 560 that displays streamed media data. The device 555 and the computing environment 502 may each be associated with and/or in communication with each other, by one or more communication methods, such as a computing network 575.

In one aspect, the computing environment 502 may provide virtualized computing services (i.e., virtualized computing, virtualized storage, virtualized networking, etc.) to device 555. More specifically, the computing environment 502 may provide virtualized computing, virtualized storage, virtualized networking and other virtualized services that are executing on a hardware substrate. In one aspect, the cognitive media update service 502 may communicate with the device 555 using network 575 (e.g., a Wi-Fi Internet connection).

The cognitive media update service 502 may include an NLP component 510, a content consuming component 511, a characteristics association component 512, a media term/content item identification component 514, a searching component 516, a user interface ("UI") component 520, and updating component 524, and a machine learning component 526.

Multiple data sources 501-503 may be provided by one or more content contributors and/or data resources. The data sources 501-503 may include, but are not limited to, media data (e.g., video files, audio files), data sources relating to one or more documents, materials related to emails, books, scientific papers, online journals, journals, articles, drafts, streamed audio data, streamed video data, and/or other various documents or data sources capable of being displayed, published, displayed, interpreted, transcribed, or reduced to text data. The data sources 501-503 may be a content site and/or all of the same type, for example, pages or articles in a wiki or pages of a blog. Alternatively, the data sources 501-503 may be of different types, such as word documents, wikis, web pages, power points, printable document format, or any document capable of being analyzed by a natural language processing system.

The data sources 501-503 may be provided as a corpus or group of data sources defined and/or identified. The data sources 501-503 may include, but are not limited to, data sources relating to one or more audio files, video files, real-time video and/or audio broadcasts, documents, historical records, government records, newspaper articles and images, mapping and geographical records and data, structural data (e.g., buildings, landmark, etc.), musical archive data, books, scientific papers, online journals, journals, articles, drafts, materials related to emails, audio data, images or photographs, video data, and/or other various documents or data sources capable of being analyzed, published, displayed, interpreted, transcribed, or reduced to text data. The data sources 501-503 may be all of the same type, for example, pages or articles in a wiki or pages of a blog. Alternatively, the data sources 501-503 may be of different types, such as audio files, video files, real-time video and/or audio broadcasts, word documents, wikis, web pages, power points, printable document format, or any audio files, video files, real-time video and/or audio broadcasts, document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from image to text, text to image, or visual recognition and analysis.

The data sources 501-503 may be analyzed by an NLP component 510 (and a searching component 516) to scan, search, data mine, analyze image data, transcribe relevant information from the data sources 501-503 (e.g., documents, emails, reports, notes, records, maps, images, video recordings, live-streaming communications, etc.). The NLP component 510 may be provided as a cloud service or as a local service.

The NLP component 510 may be associated with the content consuming component 511. The content consuming component 511 may be used for inputting the data sources 501-503 and running NLP and AI tools against them, learning the content, such as by using the machine learning component 526. It should be noted that other components of FIG. 5 may also employ one or more NLP systems and the NLP component 510 and is merely illustrated by way of example only of use of an NLP system. As the NLP component 510 (including the machine learning component 526) learns different sets of data (e.g., images, maps, landscapes, historical information, etc.), the characteristics association component 512 (or "cognitive characteristics association component") may use the artificial intelligence to make cognitive associations or links between data sources 501-503.

The media term/content item identification component 514 may be used to identify one or more updates, enhancements, or edits to media data from one or more of the data sources 501-503. That is, the media term/content item identification component 514 may identify original media data (e.g., a video's first publication) and may identify one or more updates to the media data. Also, the media term/content item identification component 514, in association with the NLP component 510, may identify keywords, topics, descriptions, and/or content subject matter in media data from one or more of the data sources 501-503.

Cognition is the mental process of knowing, including aspects such as awareness, perception, reasoning and judgment. An AI system uses artificial reasoning to interpret the data sources 501-503 and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources 501-503 and is derived or inferred by the AI interpretation.

The cognitive media update service 502 may use the searching component 516 for scanning, searching, identifying, and/or located media data (e.g. videos, audio data, live streaming data, etc.) and collect information, updates, and/or additional/enhanced media data or other data relating to the media data. That is, the searching component 517 may use one or more deep learning operations to scan, search, learn, identify, analyze, and/or locate the media data.

The cognitive media update service 502 may use the updating component 524 for updating, and/or enhancing media data (e.g., videos, audio data, live streaming data). That is, the updating component 524 may update data content in streamed media data with updated data content from the one or more data sources such as, for example, data sources 501-503 according to a defined priority (e.g., the priority stack).

The cognitive media update service 502 may also include a machine learning component 438. The machine learning component 526 may learn, adjust, teach, or update the one or more steamed media data. That is, the machine learning component 526 may learn, modify, or update the data content in streamed media data with updated data content. The machine learning includes using an NLP operation, an image and audio recognition operation, an intelligent search operation, a cognitive memory operation, or combination thereof.

Also, the machine learning component 526 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In view of components 400 of FIG. 1 and 500 of FIG. 5, consider the following example. Assume a user is watching/streaming a video in real-time based on a particular technology and/or concept taught in an education class. The cognitive media update service may execute and run in a back-end of a computing system to extract in real-time (e.g., as the video data is being streamed) one or more keywords, topics, or discussions from the video content. The content of the video may be outdated, and the user may not know or be aware of any updated information for the video. For example, if the user is watching a video on type "A" processor, an NLP operation may be executed in parallel with the streamed video and 1) process the streamed data, 2) perform a web crawl search in real-time in the back-end, and/or 3) display the updated content in a selected area of a computing device (e.g., a screen corner and/or refresh operation on the video with updated information pertaining to that topic depending upon the choice of the viewer).

Moreover, even if the user delays watching the streamed video for a selected period of time (e.g., 3 weeks) by recording the streamed video, in the back-end, the information being spoken in the video may be tested against a latest version and/or information present on a wireless communication system, a cloud computing environment, and/or internet so that the video may be updated by the cognitive media update service. In this way, the cognitive media update service provides the user the option to watch, observe, and/or check out the update on the video in real-time and/or at a future time period. The updated content, which is being fetched from an internet search/web crawl, may be selected for display, to the viewer, based on a conglomeration of ratings and viewership of that particular video content.

An NLP operation may be us to extract one or more keywords and description from the video and arrange in a defined priority (e.g., the priority stack) in order to determine and/or decide what suggestions to provide the user depending upon the priority of the stack. The order of the stack may be decided upon by what content was spoken the most about with respect to the video. Thus, the elements of the content that receive the most emphasis in the video may determine the importance of keywords used to find and sort the results. The suggestions of the priority may be provided in real time as the video is ongoing based on the current topic. There may also exist a cluster of videos based on the topic or group of topics presented in the video. The user may select to play any of the videos from the cluster being presented in the corner of the screen. Also, a lineage may be formed based on the video stream showing the progress of the content (across a period of time). A section of a video may be selected as relevant to the current content and, thus, the starting and ending points of the new content may not be the staring and end of the video. The updated content can be determined by identifying and/or comparing the versions of the videos.

Figure 6:
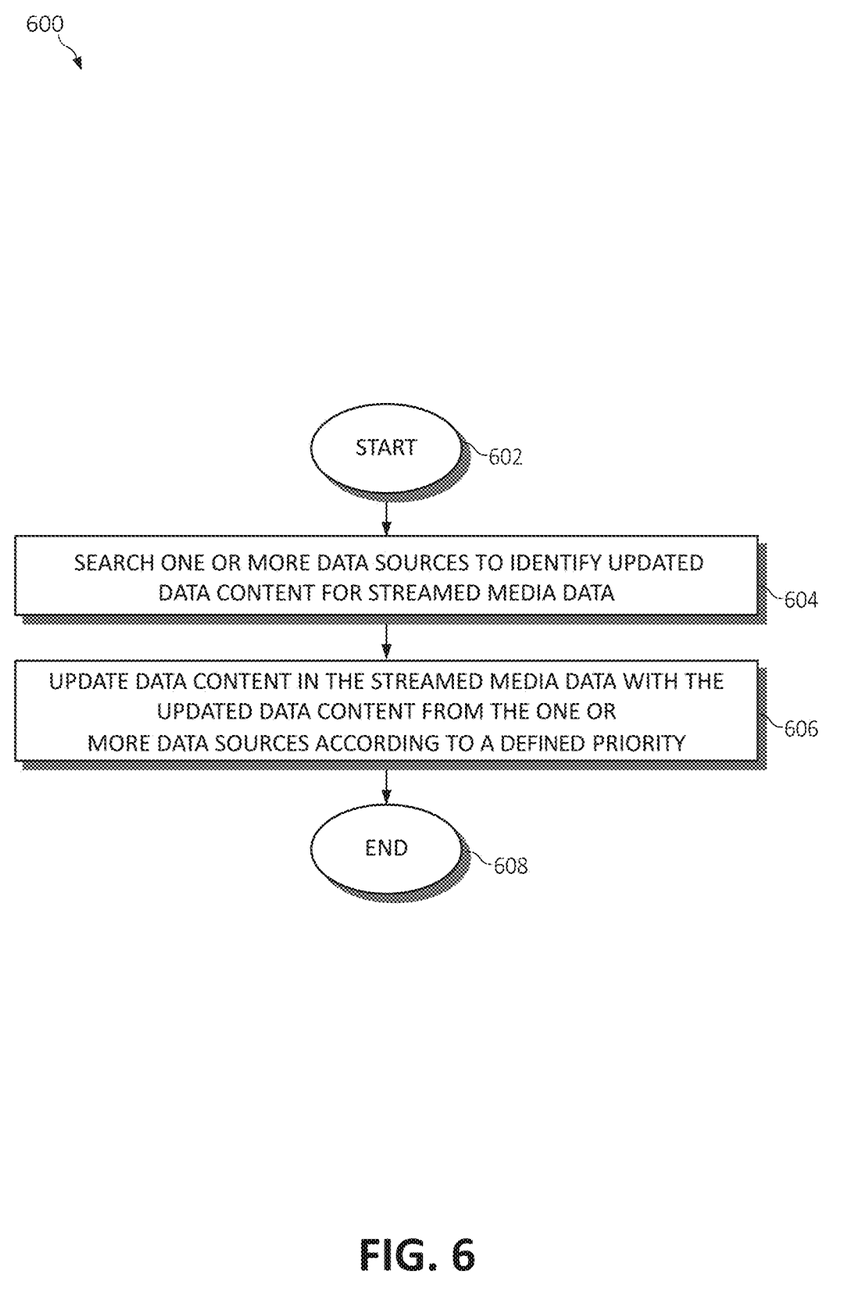
FIG. 6 is a flowchart diagram depicting an exemplary method for intelligent updating of media data in a computing system by a processor in accordance with aspects of the present invention.

FIG. 6 is a flowchart diagram depicting an exemplary method for delivery of an intelligent updating of media data in a computing environment. In one aspect, one or more of the components, modules, services, applications, and/or functions described in FIGS. 1-5 may be used in FIG. 6. The functionality 600 may be implemented as a method executed as instructions on a machine, where the instructions are included on at least one computer readable medium or one non-transitory machine-readable storage medium. The functionality 600 may start in block 602.

One or more data sources may be searched to identify updated data content for streamed media data, as in block 604. The data content may be updated in the streamed media data with the updated data content from the one or more data sources according to a defined priority (e.g., the priority stack), as in block 606. The functionality 600 may end, as in block 608.

Figure 7:
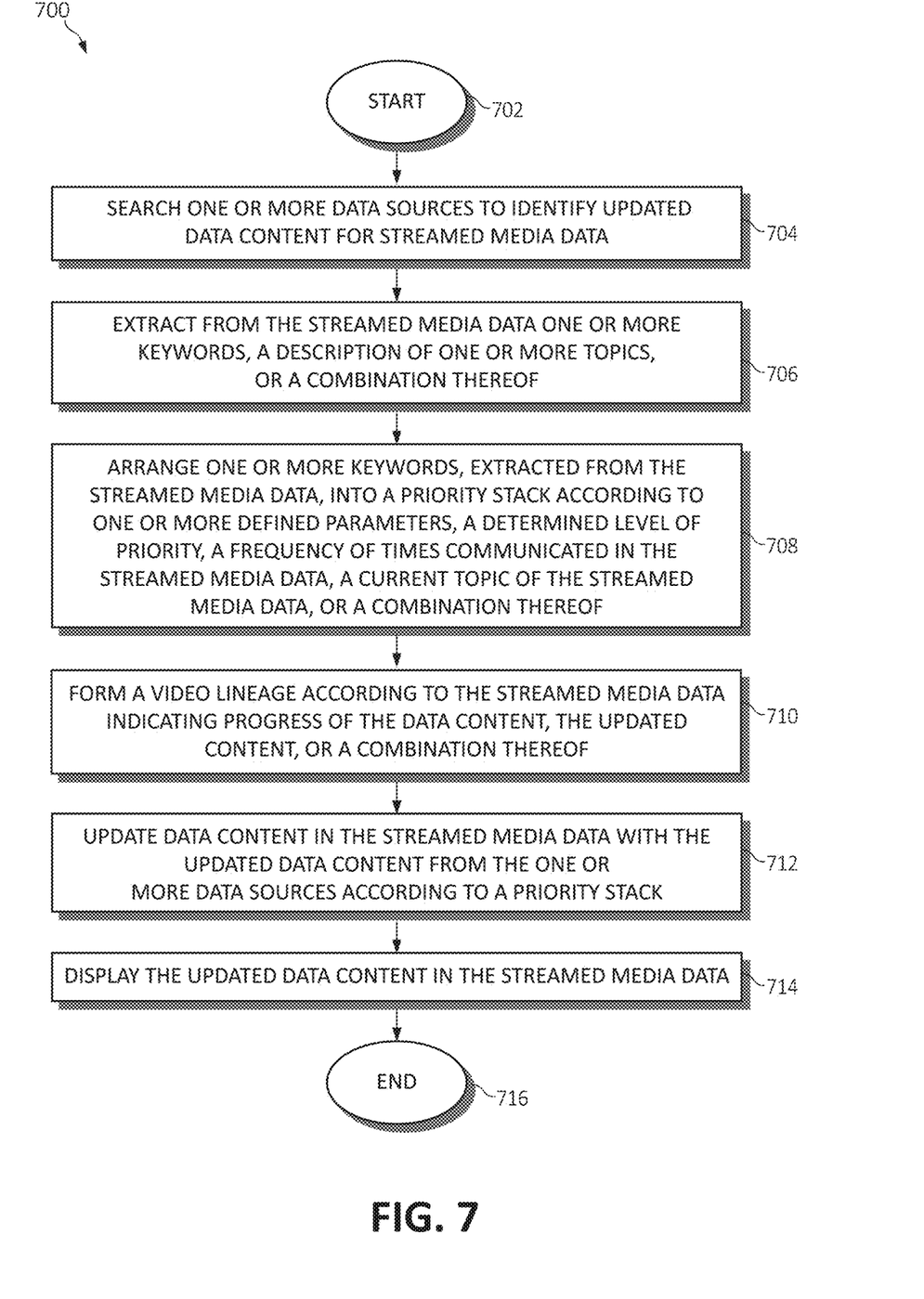
FIG. 7 is a flowchart diagram depicting an exemplary method for intelligent updating of media data in a computing system by a processor, again in which aspects of the present invention may be realized.

FIG. 7 is a flowchart diagram depicting an exemplary method for delivery of an intelligent updating of media data in a computing environment. In one aspect, one or more of the components, modules, services, applications, and/or functions described in FIGS. 1-6 may be used in FIG. 7. The functionality 700 may be implemented as a method executed as instructions on a machine, where the instructions are included on at least one computer readable medium or one non-transitory machine-readable storage medium. The functionality 700 may start in block 702.

One or more data sources may be searched to identify updated data content for streamed media data, as in block 704. One or more keywords, a description of one or more topics, or a combination thereof may be extracted from the streamed media data, as in block 706. One or more keywords, extracted from the streamed media data, may be arranged into a priority stack according to one or more defined parameters, a determined level of priority, a frequency of times communicated in the streamed media data, a current topic of the streamed media data, or a combination thereof, as in block 708. A video lineage may be formed according to the streamed media data indicating progress of the data content, the updated content, or a combination thereof, as in block 710. The content in the streamed media data may be updated with the updated data content from the one or more data sources according to the priority stack, as in block 712. The updated data content in the streamed media data may be displayed, as in block 714. The functionality 700 may end, as in block 716.

In one aspect, in conjunction with and/or as part of at least one block of FIGS. 6-7, the operations of methods 600 and/or 700 may include each of the following. The operations of methods 600 and/or 700 may compare the updated data content from one or more data sources with the data content of the streamed media data to determine whether the data content of the streamed media data is outdated. The operations of methods 600 and/or 700 may initialize a machine learning component to learn, modify, or update the data content in the streamed media data with the updated data content, wherein the machine learning includes using a natural language processing (NLP) operation, an image and audio recognition operation, an intelligent search operation, a cognitive memory operation, or combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for intelligent updating of media data in a computing system, comprising:

cognitively analyzing data content within streamed media data by using natural language processing (NLP) to extract elements identified within the streamed media itself;

searching one or more data sources as a background operation to identify updated data content comprised of updated media content for the streamed media data according to the extracted elements;

comparing the updated data content from one or more data sources with the data content in the streamed media data to determine whether the data content in the streamed media data is outdated; and responsive to determining that the data content in the streamed media data is outdated, automatically updating the data content in the streamed media data with the updated data content from the one or more data sources according to a defined priority, wherein a video lineage is formed according to differing versions of the streamed media data indicating a progress of the data content to the updated data content over time such that, as a user views the streamed media data, at least a portion of the streamed media data is replaced with the updated data content as the streamed media data is rendered according to the video lineage.

2. The method of claim 1, further including extracting from the streamed media data one or more keywords, a description of one or more topics, or a combination thereof.

3. The method of claim 1, further including arranging one or more keywords, extracted from the streamed media data, into the priority stack according to one or more defined parameters, a determined level of priority, a frequency of times communicated in the streamed media data, a current topic of the streamed media data, or a combination thereof.

4. The method of claim 1, further including initializing a machine learning component to learn, modify, or update the data content in the streamed media data with the updated data content.

5. The method of claim 1, further including displaying the updated content in at least a portion of a graphical user interface (GUI) while simultaneously displaying the streamed media data in the GUI, wherein the streamed media data is video content from one or more videos.

6. A system for intelligent updating of media data in a computing system, comprising:
one or more computers with executable instructions that when executed cause the system to:
cognitively analyze data content within streamed media data by using natural language processing (NLP) to extract elements identified within the streamed media itself;
search one or more data sources as a background operation to identify updated data content comprised of updated media content for the streamed media data;
compare the updated data content from one or more data sources with the data content in the streamed media data to determine whether the data content in the streamed media data is outdated; and
responsive to determining that the data content in the streamed media data is outdated, automatically update the data content in the streamed media data with the updated data content from the one or more data sources according to a defined priority, wherein a video lineage is formed according to differing versions of the streamed media data indicating a progress of the data content to the updated data content over time such that, as a user views the streamed media data, at least a portion of the streamed media data is replaced with the updated data content as the streamed media data is rendered according to the video lineage.

7. The system of claim 6, wherein the executable instructions that when executed cause the system to extract from the streamed media data one or more keywords, a description of one or more topics, or a combination thereof.

8. The system of claim 6, wherein the executable instructions that when executed cause the system to arrange one or more keywords, extracted from the streamed media data, into the priority stack according to one or more defined parameters, a determined level of priority, a frequency of times communicated in the streamed media data, a current topic of the streamed media data, or a combination thereof.

9. The system of claim 6, wherein the executable instructions that when executed cause the system to initialize a machine learning component to learn, modify, or update the data content in the streamed media data with the updated data content.

10. The system of claim 6, wherein the executable instructions that when executed cause the system to display the updated content in at least a portion of a graphical user interface (GUI) while simultaneously displaying the streamed media data in the GUI, wherein the streamed media data is video content from one or more videos.

11. A computer program product for intelligent updating of media data in a computing system by a processor, the computer program product comprising a non-transitory computer-readable storage medium having computer-readable program code portions stored therein, the computer-readable program code portions comprising:
an executable portion that cognitively analyzes data content within streamed media data by using natural language processing (NLP) to extract elements identified within the streamed media itself;
an executable portion that searches one or more data sources as a background operation to identify updated data content comprised of updated media content for the streamed media data;
an executable portion that compares the updated data content from one or more data sources with the data content in the streamed media data to determine whether the data content in the streamed media data is outdated; and
an executable portion that, responsive to determining that the data content in the streamed media data is outdated, automatically updates the data content in the streamed media data with the updated data content from the one or more data sources according to a defined priority, wherein a video lineage is formed according to differing versions of the streamed media data indicating a progress of the data content to the updated data content over time such that, as a user views the streamed media data, at least a portion of the streamed media data is replaced with the updated data content as the streamed media data is rendered according to the video lineage.

12. The computer program product of claim 11, further including an executable portion that:
extracts from the streamed media data one or more keywords, a description of one or more topics, or a combination thereof; and
arranges the one or more keywords, extracted from the streamed media data, into the priority stack according to one or more defined parameters, a determined level of priority, a frequency of times communicated in the streamed media data, a current topic of the streamed media data, or a combination thereof.

13. The computer program product of claim 11, further including an executable portion that initializes a machine learning component to learn, modify, or update the data content in the streamed media data with the updated data content.

14. The computer program product of claim 11, further including an executable portion that displays the updated content in at least a portion of a graphical user interface (GUI) while simultaneously displaying the streamed media data in the GUI, wherein the streamed media data is video content from one or more videos.

* * * * *